United States Patent [19]

Shtrikman et al.

[11] Patent Number: 4,558,570
[45] Date of Patent: Dec. 17, 1985

[54] COMPRESSOR UNIT IN SPLIT CYCLE CRYOGENIC COOLERS

[76] Inventors: Shmuel Shtrikman, 1 Hasharon St., Rehovoth; Menachem Danziger, Kibbutz Eyn Charod, both of Israel

[21] Appl. No.: 512,420

[22] Filed: Jul. 8, 1983

[30] Foreign Application Priority Data

Dec. 9, 1982 [IL] Israel .......................................... 67440

[51] Int. Cl.[4] .............................................. F25B 9/00
[52] U.S. Cl. ............................................. 62/6; 60/520
[58] Field of Search ................................ 62/6; 60/520

[56] References Cited

U.S. PATENT DOCUMENTS

| 3,423,948 | 1/1969 | Cowans | 62/6 |
| 4,044,567 | 8/1977 | Dix et al. | 62/6 |
| 4,306,419 | 12/1981 | Schwartz | 62/6 |

Primary Examiner—Ronald C. Capossela
Attorney, Agent, or Firm—Toren, McGeady, Stanger, Goldberg & Kiel

[57] ABSTRACT

A split cycle cryogenic cooler system of the Stirling split type comprises a compressor which is positioned in a sealed casing, the drive for the compressor being constituted by an electro-motor positioned outside the casing, magnetic torque coupling transmitting rotational movement from the motor to the piston of the compressor via a crankshaft.

2 Claims, 1 Drawing Figure

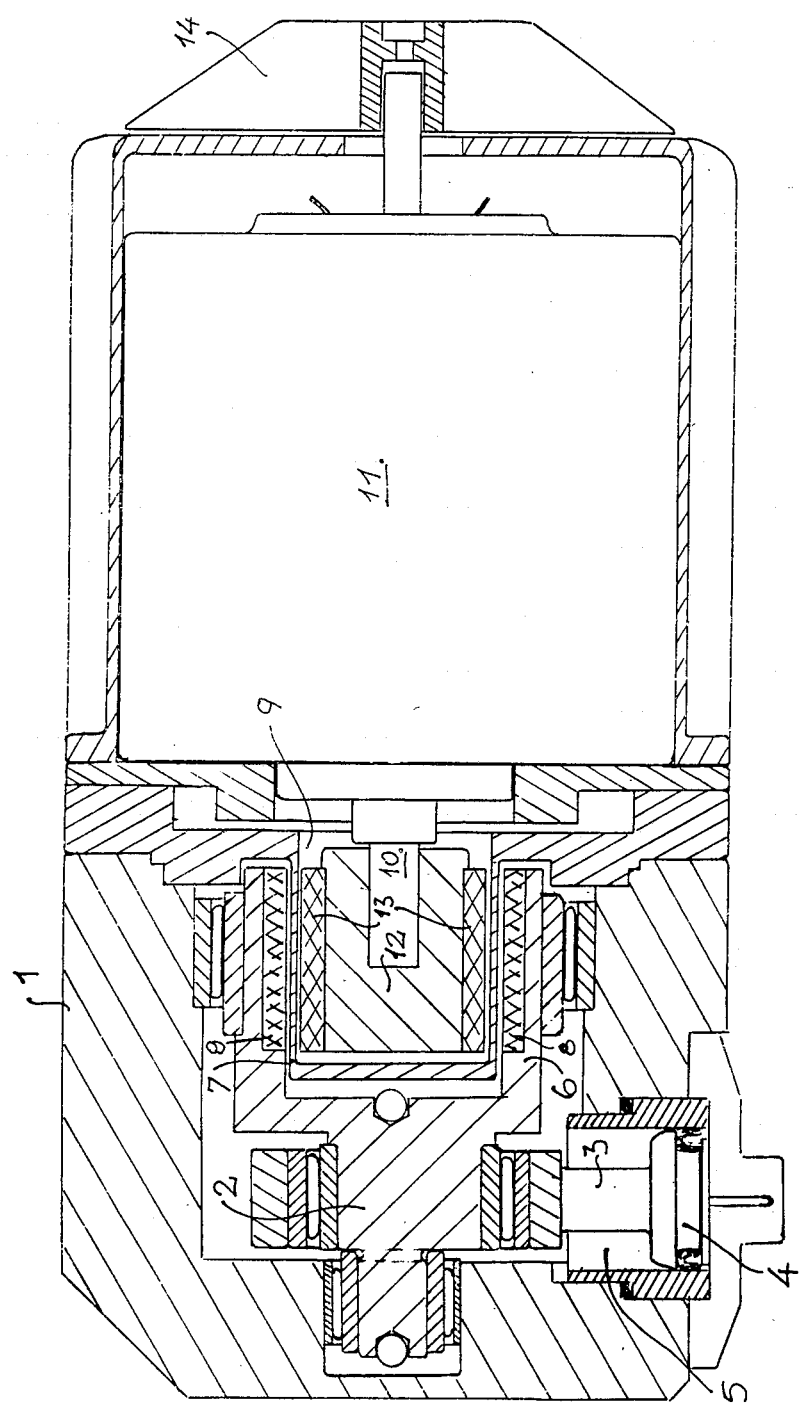

COMPRESSOR UNIT IN SPLIT CYCLE CRYOGENIC COOLERS

FIELD OF INVENTION AND ITS BACKGROUND

This invention concerns closed cycle cooling systems and more particularly those of miniature type. As is known, such systems include as basic parts thereof two major components, viz. the compressor unit and the expansion unit. One group of such coolers is of the so called "split type" wherein compressor and expander units are strictly separate from one another and are interconnected by a gas conduit or conduits.

In the split type cooler belonging to the Stirling thermodynamic cycle kind, there is provided a compressor including a crank shaft driven by an electromotor. A piston actuated by the said shaft creates the required pressure pulses.

In the last named type of cooler the electromotor is conventionally located within the gaseous atmosphere, i.e. the gas used in operating the compressor. Obviously specially designed motors have to be employed.

Now, as is known, one of the reasons for faulty performance of the cooler is contamination of the gas, caused to a large extent by residual gas remaining in the system after precleaning or due to evaporation of high pressure material in the interior of the cooler. So, e.g. organic varnishes used for insulating rotor and stator windings of the motor are a main source of gas contamination.

A further fact to be considered is that in the compressor unit converting electrical energy into mechanical energy unavoidably heat is created—being a waste—which must be removed from the compressor by means of natural or forced convection or solid conduction.

The motor, being located within the working gaseous atmosphere presents certain problems of maintenance, since—in order to reach it—the region where gas is contained in, has to be opened to the air.

It is now proposed—in order to do away with the inconvenience of maintenance of the motor located within a gaseous atmosphere—to use an ordinary—not specially designed—electromotor and to locate it at the exterior of a gas enclosing housing and to provide a magnetic torque-coupler for the rotational transfer of drive from the electromotor to the compressor crankshaft located within a casing in relation to which the motor is exteriorily located.

An additional advantage from a thus exteriorily placed motor can be derived by providing a fan at the end of the motor shaft which is opposite the driving end thereof (carrying the magnetic couple) and this way create an uninterrupted flow of air onto and about the housing in which the compressor unit is contained and so remove the heat by forced convection.

SHORT SUMMARY OF DISCLOSURE

According to the invention—therefore—there is provided in a cryogenic cooler system of the Stirling split type a compressor unit which is sealed into a casing, the drive for the said compressor unit being constituted by an electromotor positioned outside the said housing, magnetic torque coupling means being provided transmitting rotational movement from the shaft of the electromotor to a crankshaft supplying linear movement to the piston of the compressor.

In a practical embodiment of the invention the electromotor has a shaft which extends from the motor casing opposite the magnetically coupled shaft end, the said extending shaft end carrying a fan.

The magnetic means for coupling the motor located outside the sealed compartment in which the compressor is situated may be any conventional magnetic couplings, i.e. of two kinds, the reentrant type or the extended type. The reentrant type reduces the length of the assembly, while the extended type causes a decrease of compressor housing diameter.

SHORT DESCRIPTION OF DRAWING

The invention will now be described in detail with reference to the accompanying single FIGURE of schematic drawing which, incidentally, shows the new arrangement including a coupling of reentry type. It is remarked that the invention is not restricted to this type.

DETAILED DESCRIPTION OF PREFERRED EMBODIMENT

In the drawing the numeral 1 designates the sealed housing (crank case) of the compressor. The crankshaft is designated by reference numeral 2; 3 is the piston rod and 4 the piston proper, plying in the compressor cylinder 5. The crankshaft 2 has a cup shaped end member 6 into which extends a similarly cup-shaped recessed reentering portion 7 of the wall of housing 1. The inner side of the cup shaped end member 6 is lined with ferromagnetic strips 8. The reentering bulge portion 7 forms a recess 9 at the outside of the wall of casing 1 and into that recess extends the shaft 10 of an electromotor 11. On the end of shaft 10 is fixedly keyed a stub 12 on the circumference of which are affixed magnetic strips 13. The casing of the electromotor 11 may be affixed—but need not be so—to the wall of casing 1.

The shaft 10 extends from the motor at its non coupled side and carries blades 14 of a fan.

It will be seen that the novel arrangement keeps the motor out of the working gas atmosphere in the housing 1 and prevents contamination of the gas, then ensuring a longer lifetime of the cooler.

It is of advantage that the motor used may be one of commercially available standard type and need not be designed for a special purpose. Such a motor being less expensive will render the whole system less expensive.

The normal, standard motor can be subjected to maintenance in the conventional way and can even be exchanged—if necessary—without entering the gas compartment.

The external motor with a fan at the shaft end acts beneficially by directing a constant flow of air onto the compressor (crankshaft) housing.

We claim:

1. In a cryogenic cooler system of the Stirling split type comprising a casing, a compressor unit sealed into said casing, said compressor unit including a crankshaft, and a piston, and said crankshaft connected to said piston for supplying linear movement thereto, an electromotor positioned outside of said casing and forming the drive for said compressor unit, said electromotor including a shaft, magnetic coupling means being provided transmitting rotational movement from the shaft of the electromotor to said crankshaft, said electromotor has a part of said shaft extending from the motor casing opposite the magnetically coupled shaft end, and a fan mounted on said extending part of said shaft.

2. The arrangement claimed in claim 1, characterised thereby that the said magnetic coupling is of the reentrant type with said casing having a recessed portion aligned with said electromotor shaft and said shaft extending into said recessed portion.

* * * * *